United States Patent [19]
Cason et al.

[11] Patent Number: 5,222,078
[45] Date of Patent: Jun. 22, 1993

[54] DATA SIGNAL COMPENSATION APPARATUS FOR USE IN A RECEIVER

[75] Inventors: David G. Cason, Palatine; Louis J. Vannatta, Crystal Lake; Charles Choi; Dale F. Bengtson, both of Arlington Heights; James C. Baker, Hanover Park, all of Ill.

[73] Assignee: Motorola, Inc., Schaumburg, Ill.

[21] Appl. No.: 791,807

[22] Filed: Nov. 13, 1991

[51] Int. Cl.⁵ .............................................. H04L 25/06
[52] U.S. Cl. ........................................ 375/76; 375/100; 307/359
[58] Field of Search ............... 375/75, 99, 100, 76; 307/357, 358, 359; 328/149; 341/139

[56] References Cited

U.S. PATENT DOCUMENTS

| 4,250,458 | 2/1981 | Richmond et al. | 375/99 |
| 4,575,863 | 3/1986 | Butcher et al. | 375/76 |
| 4,873,702 | 10/1989 | Chiu | 307/359 |
| 5,052,020 | 9/1991 | Koenck et al. | 375/76 |
| 5,095,496 | 3/1992 | Jang | 375/362 |
| 5,119,404 | 6/1992 | Aihara | 375/76 |

OTHER PUBLICATIONS

Miyatake, Ogose, *Selection Combining Diversity Reception Effect for Coherant QPSK Under Frequency Selective Fading*, pp. 125–128, of the Transactions of The IEICE vol. E73, No. 1 Jan. 1990.

Primary Examiner—Stephen Chin
Attorney, Agent, or Firm—Kirk W. Dailey; John A. Fisher

[57] ABSTRACT

The present patent application includes a discussion of a signal compensation apparatus (119). The apparatus is implemented in a digital radiotelephone (101) having diversity receivers (111, 113). The signal compensation apparatus utilizes three control loops and a branch selection switch circuit to substantially diminish the undesired gain and DC offset present in the selected received data signal. Portions of the apparatus are implemented in a digital signal processor (DSP) (249) for rapid adjustment of the control loops when switching to a different receiver branch.

13 Claims, 1 Drawing Sheet

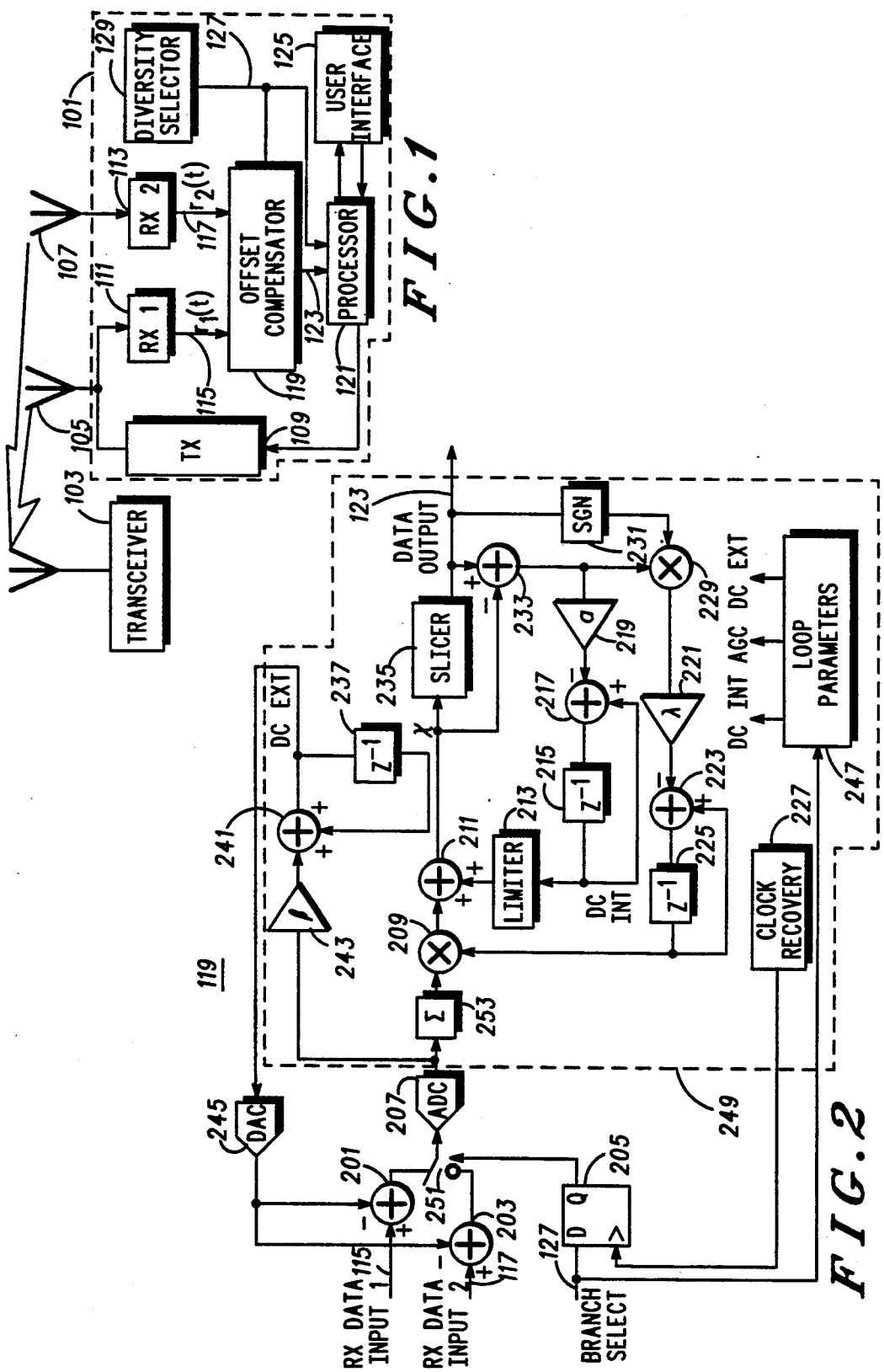

DATA SIGNAL COMPENSATION APPARATUS FOR USE IN A RECEIVER

FIELD OF THE INVENTION

Generally, this invention relates to receivers and more specifically to data signal offset compensation loops in a radio receiver.

BACKGROUND OF THE INVENTION

Radio receivers in general have problems receiving radio signals containing data. These problems include undesired AC level variations and DC offsets contained within the received data signals. Several sources of the offsets cause the problem. Namely, part tolerances, undesired offsets in the incoming signals, temperature variations and aging of parts.

In particular, digital radio receivers containing diversity are sensitive to undesired offsets in received data signals, because the offsets cause errors in the recovered data. Additionally, diversity receivers in a Rayleigh fading environment typically switch between receivers at a rate between 0 and 100 Hz. This switching rate requires a signal compensation apparatus that adapts quickly to changing conditions. Thus, digital radio receivers containing diversity require a dynamic signal compensator to remove the undesired AC level variations and DC offsets.

Several solutions are available for controlling undesired AC level variations and DC offset in a radio receiver. Namely, manually tuning the receiver before sale of the radio, manual tuning plus temperature compensation circuit, tight control of part tolerances, or a dynamic feedback control loop. These solutions all exist today, but they fall short of the stringent requirements of a digital radio receiver having diversity receivers.

First, the receiver's undesired offsets may be controlled by manually tuning the radio in the factory. This allows the AC level variations and DC offsets inherent to the radio to be tuned out for one temperature setting. This solution does not consider the AC level variations and DC offsets contained in the received signal, nor the changes in the AC level variations and DC offset over time and temperature. For some radio systems these variations are negligible. However, in a digital radio receiver containing diversity a tight control of the AC level variations and the DC offset is necessary for proper operation. Thus, the manual tune solution is insufficient.

Second, a temperature compensation circuit may be added to the manual tune to control the undesired AC level variations and DC offset over temperature variations during operation. Again, this solution will be affected by variances due to part aging and the AC level variations and DC offsets contained in the received data signals. Additionally, the temperature compensation circuit will add variation to the compensation apparatus by part tolerances and aging. Thus, this solution is inadequate.

Third, the part tolerances during the manufacturing process may be tightly controlled such that the specification and variances over time and temperature are limited. However, this becomes prohibitively expensive and does not compensate for variances in the received data signal. Again, this solution would not be sufficient for a digital radio receiver containing diversity.

Fourth, a first order feedback control loop may be added in the received data signals path. This control loop is simply implemented. The received data signal is input into a data slicer. The data slicer determines the most likely symbol the data signal is representing. The data slicer outputs one value from a choice of predetermined values. The control loop creates an error signal having a DC level equal to the difference between the received data signal DC level and the DC level of the data slicer output signal. The error signal is first order filtered and fed back into the received signal path before entering the symbol slicer. This control loop forces the input signal to lock onto one of the predetermined symbol signal levels. This control loop is free from part tolerance, temperature variance, aging and inherent DC offset limitations as previously discussed. However, problems arise when the error signal is larger than the difference between two predetermined symbol decision levels. When this occurs, the loop can falsely lock on an incorrect symbol causing substantial performance errors. In some systems the DC offset never exceeds or rarely exceeds, this limitation, thus, false locking is not a problem. However, in a quadrature phase shift keying (QPSK) modulated system the DC offset may easily exceed these thresholds and cause false locking. Frequent false locking will degrade the performance of the radio receiver.

Therefore, a need exists for a signal compensation apparatus in a radio receiver which can quickly compensate for the AC level variations and DC offsets inherent in a radio system without false locking.

SUMMARY OF THE INVENTION

The present invention encompasses a signal compensation apparatus. The apparatus has an input data signal. The input data signal represents one symbol of at least two available symbols at a certain time and the input signal contains an undesired DC offset. The apparatus detects the one symbol represented by the data input signal at the certain time. Then it generates a second signal which has a DC level representing the symbol. Next, the apparatus determines the difference in DC level between the data input signal and the second signal; generating a third signal having a DC level corresponding to this difference. The third signal is then filtered to remove any AC components which may be in the signal. The DC level of the third signal is limited to a predetermined range. The third signal is then combined with the data input signal, such that the undesired DC offset is substantially eliminated from the data input signal.

BRIEF DESCRIPTION OF THE DRAWINGS

FIG. 1 is a radiotelephone system which may employ the present invention.

FIG. 2 is an offset compensation apparatus in accordance with the present invention.

DETAILED DESCRIPTION OF THE PREFERRED EMBODIMENT

In the following description, the invention is employed in a digital radio receiver of a radiotelephone contained within a radiotelephone system. The embodiment includes the use of a digital control loop described in the background of the invention with an additional limiter employed within the loop. The limiter limits the signal range of the control loop to $\pm\frac{1}{2}$ a symbol. This limitation solves the false locking problem as described in the background of the invention. Additionally, a second control loop is employed which controls the voltage of the received data signal prior to digitization which has a slower, more coarse tuning rate, with a wider voltage range. Third, this embodiment is employed in a diversity receiver with an additional requirement in adapting the two control loops quickly when the radio switches between receivers. The requirement is met by storing estimated compensation parameters for each receiver branch. Upon switching between the receivers, the estimated parameters for the new receiver are loaded into the control loops.

FIG. 1 is a block diagram of a radiotelephone communications system which may employ this invention. The fixed site transceiver 103 transmits and receives radio frequency signals to and from mobile and portable radio telephones located within a fixed geographic service area. Radiotelephone 101 is one of the mobile or portable radiotelephones served by the fixed site transceiver 103.

This particular radiotelephone 101 contains two antennas 105, 107 which serve the diversity receivers 111, 113 and the transmitter 109. The receivers 111, 113 are quadrature phase shift keying (QPSK) receivers. The QPSK receivers 111, 113 receive signals containing data from the antennas 105, 107. The receivers 111, 113 generate received data signals 115, 117 for use by the offset compensator 119. The offset compensator 119 removes substantially all of the AC variations and DC offsets present in the received signal, chooses the most appropriate one of the four available symbols and generates a data output signal 123 corresponding to the chosen symbols. The processor 121 receives the post-slicer (post-detection) data signal 123 and reformats the data into useable information for the user interface 125. The diversity selector 129 generates the branch select signal 127 which switches the DC offset compensator 119 from the first receiver 111, to the second receiver 113 or vice versa.

On transmission, the user interface 125, which includes a microphone, a speaker and a keypad, generates data or voice signals for use by the processor 121, the processor 121 formats the signals for the transmitter 109. The transmitter 109 creates radio frequency signals from the processor signals and transmits the radio frequency signals back to the fixed site transceiver 103 via the antenna 105.

FIG. 2 is a detailed block diagram of the signal offset compensator 119 illustrated in FIG. 1. In the preferred embodiment, the offset compensator 119 contains three control loops and the data slicer 235. Namely, the DC external loop, the DC internal loop, and the automatic gain control (AGC) loop. These three loops work to eliminate the undesired AC level variations and the DC offsets contained within the selected received data signal, such that the data slicer 235 may properly choose the symbols represented by the selected received data signal. The DC external loop is a slow, coarse tune control loop which controls the DC voltage level of either of the data input signals 115, 117. The internal DC loop is a limited range control loop for quickly correcting the DC voltage level of the digitized data signals. The AGC loop controls the AC level of the digital data signals. In the preferred embodiment, the devices located within the dotted line box 249 are implemented in a digital signal processor (DSP), such as the DSP 56000 available from Motorola, Inc. Other sufficient alternatives could be easily implemented by one of average skill in the art. These alternatives include analog circuitry, logic, or a microprocessor.

The external DC control loop compensates the DC voltage level of one of the data input signals 115, 117. The external control loop includes the adder 201, the analog-to-digital converter (ADC) 207, the amplifier 243, the adder 241, the digital delay 237, the digital-to-analog converter (DAC) 245, and the switch 251. An inexpensive ADC 207 may be used such as an eight bit ADC, model No. AD7821 available from Analog Devices. Likewise, the DAC 245 may be a 8-bit DAC model No. AD7533 available from Analog Devices.

The operation of the external control loop is as follows. The signal output from the ADC 207 is input into the amplifier 243. The amplifier 243 amplifies the signal by a factor of Beta and creates a DC average of the signal. Beta is a constant set up for the life of the radiotelephone to control the gain of the amplifier 243. The digital delay 237 is used to store the previous average DC level of the control loop signal. The output of the digital delay 237 is added to the output of the amplifier 243. The gain of the amplifier 243 sets the bandwidth of the external control loop. This delayed average DC level is input into the DAC 245. The DAC 245 converts the DC level to an analog signal. The analog signal is then subtracted from both received data input signals 115, 117 at the adders 201, 203.

The ADC 207 is most efficiently operated when the input signal has an average voltage level of zero volts. The external DC control loop forces the average DC voltage level of the received data input signal 115, 117 towards zero, thereby allowing full use of the limited voltage operating range of the ADC 207. The external DC control loop allows utilization of an inexpensive 8-bit ADC. Without the external control loop a more expensive, higher resolution ADC would be necessary.

The digital input signal output by the ADC 207 is input into the integrator 253. The integrator outputs an integrated digital signal for use by the data slicer 235 and the internal control loops.

The internal DC compensation loop includes the symbol slicer 235, the adder 233, the amplifier 219, the adder 217, the digital delay 215 and the limiter 213 and the adder 211. Ignoring the multiplier 209 and adder 211 the integrated digital received data input signal is input into symbol slicer 235. At a slice time determined by the clock recovery circuit 227, the symbol slicer 235 chooses the most appropriate one of the four available symbols in a QPSK system. The choice of symbols is based upon the DC level of the integrated signal at the slice time. If the level of the input signal is offset from the true value due to AC level variations or DC offsets, then the symbol slicer 235 may err when choosing the symbols. The slicing process is also known as symbol detection. The data output signal 123 contains the predetermined DC level of the chosen symbol. The DC level of the output signal 123 is subtracted from the symbol slicer 235 input DC level at adder 233. The adder 233 outputs an error signal having a DC level equal to the difference between the symbol slicer 235 input signal DC level and the data output signal 123 DC level. This error signal is input into a first order filter which averages the error signal. The first order filter includes the amplifier 219, which has a fixed gain of alpha. The output of the amplifier 219 is subtracted from the delayed previous result which is contained in the digital delay 215 at the adder 217. In the preferred embodiment, the output of the adder 217 is input into the limiter 213. The limiter 213 limits the DC level to a predetermined range to avoid false locking in the DC internal control loop. The limiter 213 is not necessary for all implementations of similar systems and the predetermined range of the limiter 213 may be changed for a particular application; these decisions may be made by one of average skill in the art. In the preferred embodiment, the predetermined range is equal to ½ DC level between symbols in either direction. The resulting limited DC level is added to the digital received data input signal at the adder 211, moving the DC level of the digital received data input signal towards one of the desired predetermined symbol decision DC levels. In the preferred embodiment, the internal DC compensation loop is driven by the clock recovery circuit 227.

The third loop is the automatic gain control loop. The automatic gain loop (AGC) utilizes the error signal produced by the internal DC control loop in combination with the sign of the data output signal 123 to form the absolute value of the gain at the multiplier 229. The output of the multiplier 229 is input into the amplifier 221. The amplifier has a gain constant lambda. The result of the amplifier is subtracted from the previous result stored in the digital delay 225. This error gain signal is combined at multiplier 209 with the digital received input signal. The AGC loop controls the gain of the signal input into the symbol slicer 235. In the preferred embodiment, the AGC loop is driven by the clock recovery circuit 227. These three loops together substantially eliminate all of the undesired AC level variations and DC offset of the selected received input signal prior to the symbol slicer 235.

Additionally, there is a diversity selection circuitry 129 contained within the radiotelephone 101. This circuitry 129 is used to decide when a switch between active receivers is desired. When a change between the two receiver signals is desired, the diversity selection circuitry 129 generates a branch select signal 127. The branch select signal 127 is input into the D flip-flop 205 of the offset compensation circuitry 119 and the microprocessor 121. The clock recovery circuit 227 ensures that the slicer 235 makes the symbol decision at the optimum time and outputs a clock signal to the D flip-flop 205 at this optimum time. This controlled switching minimizes the effect of the receiver switch for the three loop filters.

When switching between the outputs of the adders 201, 203 the AC level variations and the DC offset may change. This change is due to differing part tolerances and temperature in the two branches. In order for a quick transition in the control loops to occur, the compensation parameters for the new received branch are loaded into the signal compensation circuit 119. In the preferred embodiment, the signal compensation parameters are the last estimated offset values of the newly selected branch and they are loaded into the digital delays 225, 237, 215. In order for this quick transition to occur, the delay circuitry in the preferred embodiment is implemented in the DSP 249.

This invention could be adapted to any number of antenna branches and receivers by one of average skill in the art. Additionally, similar results could be obtained in a single branch detector by implementing the external DC loop, however, because of the unique requirements of the diversity receiver, including the quickness needed and the sensitivity to AC level variations and DC offsets, all the control loops are required in this embodiment.

What is claimed is:

1. A signal compensation apparatus accepting a first signal having a DC level, AC components and representing a first predetermined symbol at a first predetermined time, a portion of the DC level being an undesired DC offset, the signal compensation apparatus comprising:
   means for detecting a first symbol within the first signal at the first predetermined time, including generating a second signal having a DC level representing said first symbol;
   means for determining a difference between the DC levels of said first and said second signals and generating a third signal equal to said difference;
   means for filtering the AC components from said third signal, forming a fourth signal;
   means for limiting the DC level of the fourth signal to a predetermined range, forming a fifth signal; and
   means for combining said fifth signal with the first signal, such that the undesired DC offset is substantially eliminated.

2. A signal compensation apparatus in accordance with claim 1 wherein said predetermined range is equal to the difference between the first symbol DC level and a second symbol DC level.

3. A signal compensation apparatus in a radiotelephone, the radiotelephone including at least a first and a second receiver and a branch selector circuit, the first and second receiver generating a first and a second input signal having an AC and DC level, the signal compensation apparatus comprising:
   means for accepting the first and the second input signal;
   means for selecting a first one of the first and the second input signals, said means for selecting dependent upon parameters generated by the branch selector circuit, forming a first selected signal;
   means for loading a first set of compensation parameters related to said first selected signal into a means for compensating;
   means for digitizing said first selected signal forming a digital signal, said means for digitizing having a limited DC operating range;
   first means for compensating said DC level of said first selected signal utilizing said first set of compensation parameters, such that said DC level is within said limited DC operating range;
   means for slicing said digital signal, said digital signal presumed to have a predetermined AC signal level;
   second means for compensating the AC level of said digital signal to said predetermined AC signal level utilizing said first set of compensation parameters; and
   third means for compensating the DC level of said digital signal utilizing said first set of compensation parameters, removing substantially all DC offset present in said digital signal.

4. A signal compensation apparatus in accordance with claim 3 further comprising:
   means for selecting a second one of said first and said second input signals based upon parameters generated by the branch selector circuit, forming a second selected signal; and
   means for loading a second set of compensation parameters related to said second selected signal.

5. A signal compensation apparatus for use in a radio, the radio having at least a first and a second receiver and a receiver selector circuit, the first and second receiver generating a first and a second received signal respectively, the received signal containing AC components and a DC level representing a first symbol at a first predetermined time, at least a portion of the DC component of the received signal being an undesired DC offset, the signal compensation apparatus comprising:

means for accepting the first and the second received signals;

means for selecting a first one of the first and the second received signals based upon parameters generated by the receiver selector circuit, forming a first selected signal;

means for loading a first set of compensation parameters related to said first selected signal into a means for compensating;

means for digitizing said first selected signal forming a digital signal having a DC level and AC components, said means for digitizing having a limited DC operating range;

first means for compensating said DC level of said first selected signal utilizing said first set of compensation parameters, such that said DC voltage level falls within said limited DC voltage operating range of said means for digitizing;

means for detecting the first symbol of said digital signal at the first predetermined time, the first symbol having a predetermined DC level, said means for detecting assuming said digital signal has a predetermined AC signal level;

second means for compensating the AC level of said digital signal to said predetermined AC signal level utilizing said first set of compensation parameters; and third means for compensating the DC level of said digital signal utilizing said first set of compensation parameters, removing substantially all undesired DC offset present in said digital signal.

6. A signal compensation apparatus in accordance with claim 5 further comprising:

means for selecting a second one of the first and the second input signals based upon a signal generated by the branch selector circuit, forming a second selected signal; and means for loading a second set of compensation parameters related to said second selected signal into said means for compensating.

7. A signal compensation apparatus in accordance with claim 5 wherein said means for selecting a first one of the first and second received signals occurs at the first predetermined time.

8. A signal compensation apparatus in accordance with claim 5 wherein said means for compensating said DC level of said first selected signal further comprises:

means for averaging said DC level of said digital signal;

means for generating a signal equal to said average DC level of said digital signal; and means for combining said signal equal to said average DC level of said digital signal and said first selected signal.

9. A signal compensation apparatus in accordance with claim 8 wherein said means for combining further comprises subtracting.

10. A signal compensation apparatus in accordance with claim 5 wherein said means for compensating said DC level of said digital signal further comprises:

means for generating an error signal equal to the difference between said predetermined DC level of the symbol and said DC level of said digital signal;

means for filtering said error signal; and means for combining said error signal with said digital signal, such that the undesired DC offset is substantially eliminated.

11. A signal compensation apparatus in accordance with claim 5 wherein said limited DC voltage operating range is equal to the difference between the first symbol DC level and the second symbol DC level.

12. A signal compensation apparatus in accordance with claim 10 further comprising means, in response to said means for filtering, for limiting said error signal to a predetermined range.

13. A signal compensation apparatus in accordance with claim 10 wherein said means for combining is adding.

* * * * *